United States Patent [19]

Pond et al.

[11] Patent Number: 4,890,921

[45] Date of Patent: Jan. 2, 1990

[54] SCANNING INTERFEROMETER

[75] Inventors: Charles R. Pond, Federal Way; Patrick D. Texeira, Renton; Robert W. Rudeen, Seattle, all of Wash.

[73] Assignee: The Boeing Company, Seattle, Wash.

[21] Appl. No.: 253,362

[22] Filed: Sep. 29, 1988

Related U.S. Application Data

[63] Continuation of Ser. No. 895,259, Aug. 11, 1986, abandoned.

[51] Int. Cl.[4] .............................................. G01B 9/02
[52] U.S. Cl. .................................. 356/349; 356/356; 356/358
[58] Field of Search ............... 356/349, 356, 358, 360, 356/363, 353; 350/358

[56] References Cited

U.S. PATENT DOCUMENTS

| | | | |
|---|---|---|---|
| 3,780,217 | 12/1973 | Sawatari . | |
| 4,105,336 | 8/1978 | Pond | 356/353 |
| 4,215,938 | 8/1980 | Farrand et al. . | |
| 4,321,564 | 3/1982 | Tregay | 350/358 |
| 4,329,059 | 5/1982 | Pond et al. | 356/353 |
| 4,436,417 | 3/1984 | Hutchin | 356/358 |
| 4,457,625 | 7/1984 | Greenleaf et al. | 356/360 |
| 4,474,467 | 10/1984 | Hardy et al. | 356/358 |
| 4,512,661 | 4/1985 | Claus et al. | 356/358 |

FOREIGN PATENT DOCUMENTS

| | | | |
|---|---|---|---|
| 0167410 | 1/1986 | European Pat. Off. | 356/349 |
| 173703 | 10/1982 | Japan | 356/358 |

OTHER PUBLICATIONS

Multiple Channel Interferometer for Metrology, C. R. Pond, M. H. Horman, and P. D. Texeira, Applied Optics, vol. 10, No. 9, Sep. 1971.

Primary Examiner—Vincent P. McGraw
Assistant Examiner—S. A. Turner
Attorney, Agent, or Firm—Christensen, O'Connor, Johnson & Kindness

[57] ABSTRACT

A scanning interferometer that is capable of measuring the complete relative movement of up to 10 or more measurement sites on a test structure, to determine thermal distortion or expansion. The interferometer includes means for dividing a source beam into signal and reference beams, and an acousto-optic deflector for deflecting the signal beam in response to a control signal to produce a deflected signal beam. The control signal is generated such that deflected signal beams are sequentially directed to the different measurement sites. Reflection means at each measurement site reflects the deflected signal beam to produce a reflected signal beam. Each reflected signal beam is combined with the reference beam to produce an interference pattern, and a photodetector positioned in the interference pattern produces a fringe signal. Signal processing means are provided for periodically measuring the phase of the fringe signal for each deflected signal beam, to thereby measure the movement of each measurement site. In a preferred embodiment, each reflection means produces nine reflected signal beams, and the signal processing means simultaneously measures the phases of the nine resulting fringe signals.

19 Claims, 4 Drawing Sheets

SCANNING INTERFEROMETER

This application is a continuation application based on prior copending application Ser. No. 06/895,259, filed on Aug. 11, 1986.

FIELD OF THE INVENTION

The present invention relates to interferometers, and in particular to a multiple channel, scanning interferometer useful for measuring the thermal expansion coefficients of materials and the thermal distortion of structures.

BACKGROUND OF THE INVENTION

An interferometer is an instrument in which a beam of coherent electromagnetic radiation, e.g., optical radiation, is divided into signal and reference beams. The signal and reference beams are caused to travel different paths, and are then combined to produce an interference pattern. Measurement of the interference pattern can provide very sensitive information concerning the lengths of the paths traversed by the respective beams. If the signal beam is reflected off a test structure being monitored for thermal distortion, the result is that very small thermally induced distortions can be detected. Alternatively, if the signal and reference beams are reflected off different portions of a test material, the coefficient of thermal expansion of the test material can be determined. In a multiple channel interferometer, the signal beam is divided into a plurality of signal beams, and each signal beam is reflected off a different point of a structure or material under test.

One early multiple channel interferometer for use in thermal distortion measurements is described in U.S. Pat. No. 4,105,336. In that interferometer, a laser beam is divided by a beam splitting device into signal and reference beams. The signal beam is spatially filtered by reflection off a small signal beam mirror, collimated, and passed through a window into an environmental chamber containing the test structure. The signal beam is reflected from four reflectors fastened to the test structure at spaced-apart positions, to produce a corresponding set of four reflected signal beams. The reference beam produced by the beam splitter is transmitted directly into the test chamber and is reflected from a reflector at the far end of the test chamber from the entrance window. This reflector produces a reflected reference beam that is slightly offset from the incoming reference beam. The reflected reference beam is spatially filtered by reflection off a small reference beam mirror, and then combined with each of the reflected signal beams to produce four composite beams. Both the signal and reference beam mirrors are attached to a common, mechanically vibrated structure, so that both beams are modulated at an identical frequency. The four composite beams are directed to four photodetectors, and the output of each photodetector is monitored to produce information concerning movement of the test structure. The modulation of the signal and reference beams by the vibrating signal and reference mirrors permits the direction of movement as well as the movement distance to be determined. This interferometer was used to measure the thermal distortion of the truss for the large space telescope, the truss consisting of cylindrical structure 6.5 meters long and 3.4 meters in diameter that was designed to hold the primary and secondary mirrors of a 3 meter telescope in alignment.

In order to improve the capabilities of the interferometer described above, a 19-beam interferometer was subsequently built that was capable of the simultaneous measurement of the relative movement of 19 positions on a single test structure. In this improved interferometer, acousto-optic modulators are used in place of vibrating mirrors to modulate the signal and reference beams at 80 MHz and 81 MHz respectively, to produce a 1 MHz different frequency that is used as a reference signal. The advantage of a 19-beam interferometer is that it can measure the complete relative movement of two positions on a test structure. In a typical setup, nine beams are used for each measurement position. Six beams are required for measuring 6 degrees of freedom of the test structure, and three beams are required for measuring the tilt of the nine-beam cluster relative to a reference plate. Such a 19-beam interferometer is described in U.S. Pat. No. 4,329,059. Although in principle, the interferometer described in that patent could be increased in size to permit the simultaneous measurement of more than two positions on a test structure, a practical limit to such an expansion is soon reached. For example, in order to measure the complete relative movement of ten positions on a test structure, 90 beams would be required, each beam requiring its own means for directing the beam along an appropriate optical path. The impracticality of such an instrument has to date prevented the expansion of the capabilities of multibeam interferometers described above.

SUMMARY OF THE INVENTION

The present invention provides a scanning interferometer that is capable of measuring the complete relative movement of up to 10 or more measurement sites on a test structure, thereby providing an enhanced capability for making high precision measurements of thermal distortion and thermal expansion.

In a preferred embodiment, the scanning interferometer comprises a source of coherent radiation, beam splitter means for dividing the radiation into reference and signal beams, and deflection means for deflecting the signal beam in response to a control signal to produce a deflected signal beam. The control signal is generated such that a plurality of deflected signal beams are sequentially produced, with each deflected signal beam being directed to a different one of the respective measurement sites. Reflection means at each measurement site reflects the deflected signal beam to produce a reflected signal beam. Each reflected beam is combined with the reference beam to produce an interference pattern, and a photodetector positioned in the interference pattern produces a fringe signal. Signal processing means are provided for periodically measuring the phase of the fringe signal for each deflected signal beam, to thereby measure the movement of each measurement site.

In a preferred embodiment, each reflection means produces nine reflected signal beams that in combination contain information specifying the position and orientation of the corresponding measurement site. The combining means combines each reflected signal beam with the reference beam to produce an interference pattern, and the detection means comprises nine photodetectors for measuring the irradiance at points in the respective interference patterns. Each photodetector produces a fringe signal, and the signal processing means periodically measures the phase of each fringe signal, to thereby measure the movement of the measurement site. In a further preferred embodiment, the interferometer includes means for modulating the signal and reference beams at respective first and second frequencies, and the signal processing means includes means for producing a reference signal having a frequency equal to the difference between the first and second frequencies. The signal processing means is responsive to the reference signal for periodically measuring the phase of each fringe signal. The deflection means preferably comprises an acoustooptic deflector through which both the signal and reference beams pass.

DETAILED DESCRIPTION OF THE INVENTION

Figure 1:
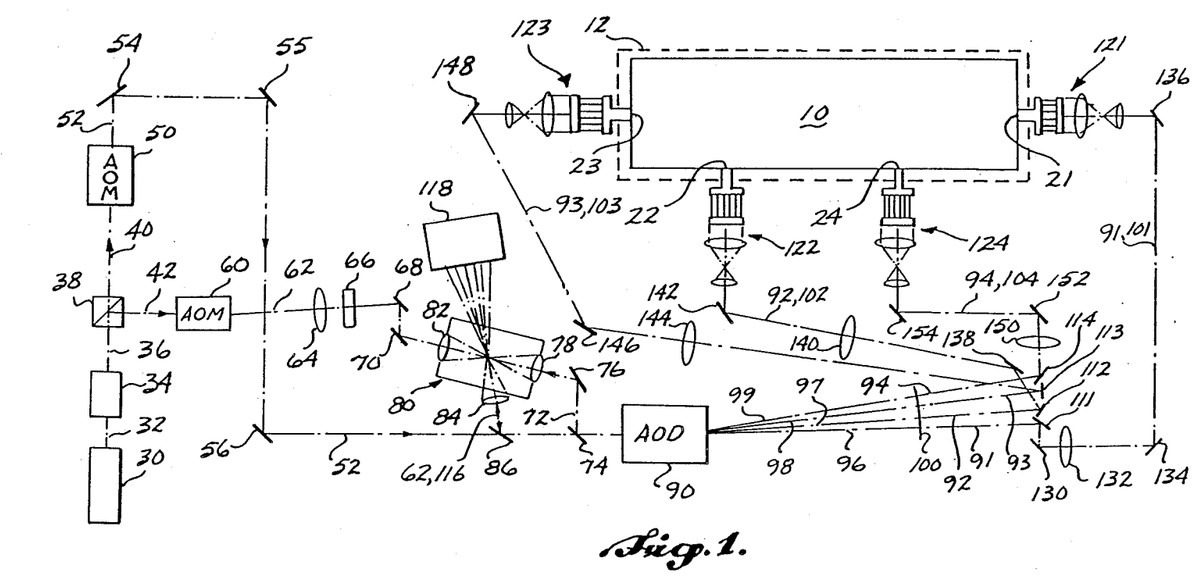
FIG. 1 is a schematic top plan view of a preferred embodiment of the scanning interferometer of the present invention.
Figure 2:
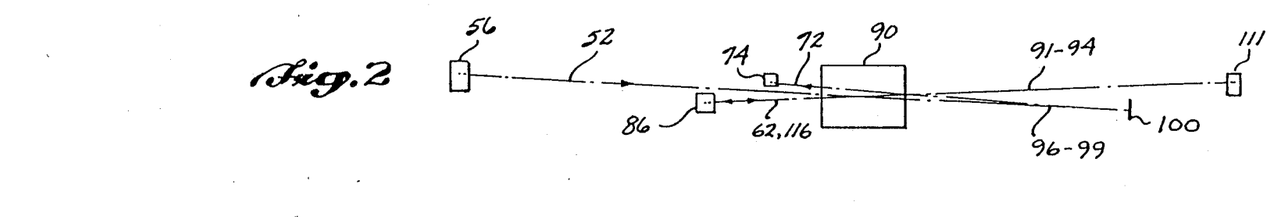
FIG. 2 is a partial side elevational view of the embodiment shown in FIG. 1.

FIGS. 1 and 2 illustrate one preferred embodiment of the present invention. FIG. 1 is a top plan view, whereas FIG. 2 is a corresponding partial side elevational view. The illustrated embodiment is designed to measure the thermal distortion of test structure 10 that is enclosed with environmental enclosure 12. In particular, the system is adapted to measure the complete relative movement of measurement sites 21-24 on test structure 10. As will be appreciated from the following description, the present system could readily be expanded to measure the complete relative movement of ten or more such measurement sites. However, a four measurement site embodiment is described herein for ease of illustration and description.

The interferometer system of FIG. 1 includes laser 30 that generates a beam 32 of coherent radiation. A suitable laser is a stabilized, single frequency helium neon laser. Laser beams 32 is passed through polarization rotator 34, and the beam 36 emerging from the polarization rotator is passed into polarizing beam splitter 38. Beam splitter 38 divides beam 36 into reference beam 40 and signal beam 42. The use of polarization rotator 34 in conjunction with polarizing beam splitter 38 permits a simple adjustment of the relative intensities of the reference and signal beams, without a realignment of components. Reference beam 40 is modulated by acousto-optic modulator (AOM) 50, and the modulated reference beam 52 emerging from AOM 50 is reflected from relay mirrors 54-56 into acousto-optic deflector (AOD) 90.

Signal beam 42 is input to acousto-optic modulator (AOM) 60, and AOM 60 produces modulated signal beam 62 that passes through relay lens 64 to half-wave plate 66. The half-wave plate changes the signal beam polarization to horizontal polarization to match the polarization of the reference beam. From half-wave plate 66, signal beam 62 is passed by relay mirrors 68 and 70 into filter/combiner 80 that is described in detail in U.S. Pat. No. 4,329,059. Filter/combiner 80 includes a microscopically small mirror (not shown) that acts as a spatial filter or beam cleaner to produce a more spatially coherent signal beam. The spatially filtered signal beam 62 reflected from the microscopic mirror passes through lens 84 to mirror 86, and mirror 86 reflects the signal beam into AOD 90.

As described in greater detail below, AOD 90 operates in response to a control signal to sequentially deflect signal beam 62 in a horizontal plane at four different angles, to sequentially produce four deflected signal beams 91-94. AOD 90 simultaneously deflects reference beam 52 to produce four deflected reference beams 96-99. Although the deflected reference beams are deflected at the same set of angles as the deflected signal beams, the deflected signal and reference beams are not superimposed, due to the fact that mirror 56 from which reference beam 52 enters AOD 90 is positioned somewhat above mirror 86 from which signal beam 62 enters AOD 90. Therefore as best shown by comparing FIGS. 1 and 2, deflected reference beams 96-99 all strike spherical mirror 100, and the resulting reflected reference beams are reflected back into AOD 90 along the same paths traveled by deflected reference beams 96-99. AOD 90 converts all reflected reference beams to a single reflected reference beam 72. Spherical mirror 100 is oriented such that reflected reference beam 72 is positioned slightly above the incident reference than relay mirror 56. From relay mirror 74, reflected reference beam 72 is reflected by relay mirror 76 into filter/combiner 80 via lens 78. In this arrangement, the reference beam makes a double pass through AOD 90 in order to compensate for the signal beam frequency shift in the AOD.

Deflected signal beams 91-94 pass above spherical mirror 100, and strike relay mirrors 111-114, respectively. From these relay mirrors, deflected signal beams 91-94 are respectively directed to measurement structures 121-124 that are, in turn, positioned at respective measurement sites 21-24. Deflected signal beam 91 travels from mirror 111 to measurement structure 121 via mirror 130, lens 132, and mirrors 134 and 136. In a similar manner, deflected signal beam 92 is reflected from mirror 112 to measurement structure 122 via mirror 138, lens 140 and mirror 142. Deflected signal beam 93 is reflected from mirror 113 to measurement structure 123 via lens 144 and mirrors 146 and 148. Finally, deflected signal beam 94 is reflected from mirror 114 to measurement structure 124 via lens 150 and mirrors 152 and 154.

As described in greater detail below, each of measurement structures 121-124 receives a deflected signal beam and produces nine reflected signal beams that retrace the path of the deflected signal beam back to AOD 90. The sets of nine reflected signal beams, produced by measurement structures 121-124 are designated by reference numerals 101-104, respectively. AOD 90 produces a single set of nine reflected signal beams 116 that is reflected from mirror 86 into filter/combiner 80 via lens 84. The diffraction patterns of the nine reflected signal beams formed at the microscopic mirror of the filter/combiner are much larger than the mirror, so that the optical loss of the reflected signal beams due to the mirror is low. Filter/combiner 80 combines each of the nine reflected signal beams received via lens 84 with reflected reference beam 72 received through lens 78, and each of the combined reflected signal and reference beams is then incident onto one of nine photodetectors of photodetector array 118. The combination of each reflected signal beam with the reflected reference beam produces an interference pattern, and the corresponding photodetector measures the irradiance at a point in the interference pattern, to produce an electrical fringe signal. As is well known to those skilled in the art, variations in the path lengths of the reference and signal beams will cause the interference pattern to shift in position, thereby producing a time varying fringe signal that may be monitored to detect movement of test structure 10.

Figure 3:
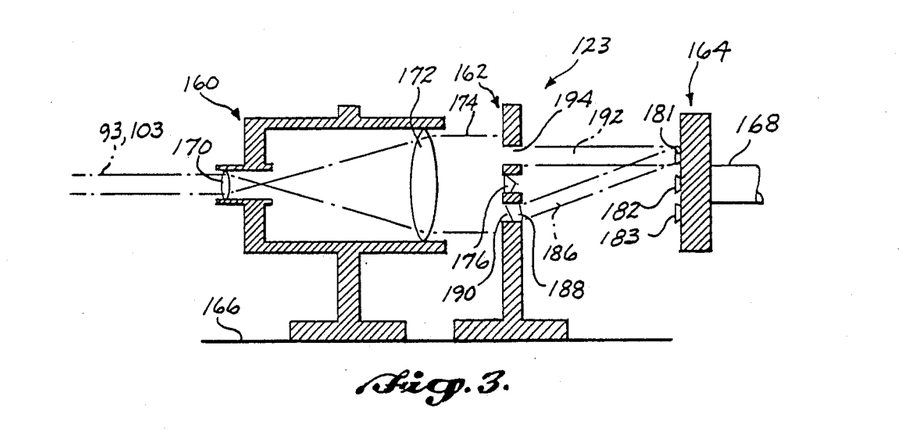
FIG. 3 is a schematic cross-sectional view of a measurement structure.

A preferred embodiment for measurement structure 123 is illustrated in FIG. 3, the other measurement structures preferably being identical to measurement structure 123. Measurement structure 123 comprises collimator 160, reference structure 162 and test plate 164. Collimator 160 and reference structure 162 are positioned on any suitable reference platform 166, and test plate 164 is connected to test structure 10 by support 168. Reference platform 166 and reference structure 162 are composed of low thermal expansion materials, and are held at near constant temperatures so as to reduce their relative motion to a level below the required measurement precision. Collimator 160 is a conventional device that includes lenses 170 and 172. The collimator operates to expand deflected signal beam 93 into expanded signal beam 174. The expanded signal beam is then incident onto reference structure 162. Reference structure 162 includes three retroreflectors 176 (only one retroreflector 176 illustrated) positioned to intercept portions of expanded signal beam 174 to produce three reflected signal beams that pass back through collimator 160 and form three of the nine reflected signal beams 103. The three reflected signal beams produced by retroreflectors 176 of reference structure 162 are used by the interferometer to determine the orientation of reference structure 162 with respect to deflected signal beam 93.

The orientation of test plate 164 with respect to reference structure 162 is determined by means of three retroreflectors 181–183 secured to test plate 164, and means included within reference structure 162 for forming six test beams. FIG. 3 illustrates in exemplary fashion test beam 186 that is formed by prism 188 positioned within aperture 190 of reference structure 162, but does not show two other prisms similar to prism 188 (that are positioned in two other apertures), each of which form a test beam in like fashion. Prism 188 directs test beam 186 to retroreflector 181. FIG. 3 also illustrates in exemplary fashion test beam 192 that is formed by aperture 194, two other apertures (not shown) likewise being provided in reference structure 162, to form the two other test beams. In the case of test beam 192, no prism is required, since the path of the test beam is an extension of a portion of the path of expanded signal beam 174. The other four test beams are not illustrated in FIG. 3. Reference structure 162 uses the three prisms and three apertures to direct three test beams to retroreflector 181, two test beams to retroreflector 182, and one test beam to retroreflector 183. Each test beam is reflected by its corresponding retroreflector back through its point of formation in reference structure 162, to thereby become one of six reflected signal beams 103. These six reflected signal beams provide six distance measurements between reference structure 162 and test plate 164. These six measurements may then be used, in a manner well known to those skilled in the art, to provide both the absolute position and absolute orientation of test plate 164 with respect to reference structure 162.

Figure 4:
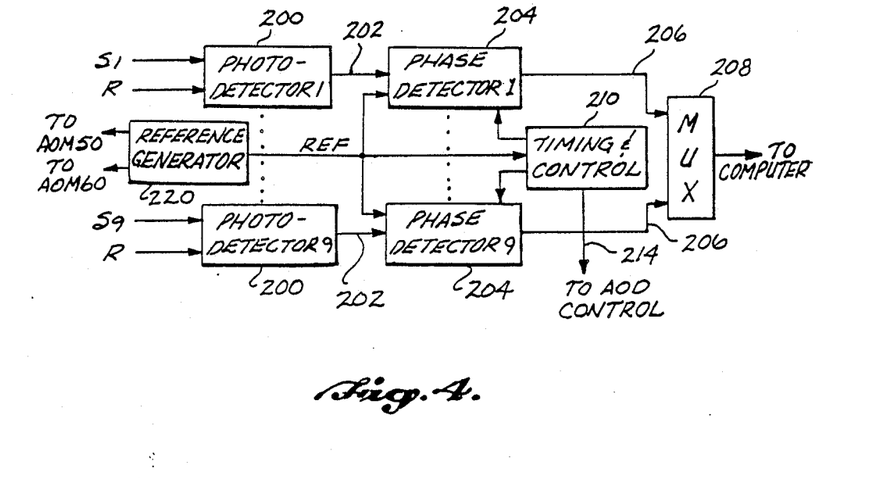
FIG. 4 is a block diagram of the signal processing components of the interferometer.

FIG. 4 presents a simplified block diagram of the signal processing components of the scanning interferometer. The signal processing components comprise nine photodetectors 200 that comprise photodetector array 118 of FIG. 1. Each photodetector receives one of the nine reflected signal beams 116 (designated S1–S9 in FIG. 4) and the reflected reference beam 72 (designated R in FIG. 4). Each photodetector produces a fringe signal 202 that has an amplitude proportional to the irradiance produced at a given position in the interference pattern resulting from the combination of signal and reference beams. The relative phases of the fringe signals are determined by phase detectors 204 by comparing the fringe signal phases to the phase of a REF signal produced by reference generator 220. Reference generator 220 provides the modulation signals to AOM 50 and AOM 60, and provides the REF signal at a frequency equal to the difference in the modulation frequencies. The phase signals 206 produced by phase detectors 204 are input to multiplexer 208. Multiplexer 208 sequentially passes the nine phase signals to a computer for further processing. Timing and control circuit 210 receives the REF signal and uses it to coordinate the operations of the phase detectors. The timing and control circuit also produces a control signal 214 that is used to control AOD 90 shown in FIGS. 1 and 2.

An overall sequence of operations for the signal processing system shown in FIG. 4 is as follows. Timing control circuit 210 produces a control signal 214 that causes AOD 90 to deflect signal beam 52 to produce deflected signal beam 91. Deflected signal beam 91 thereby proceeds to measurement structure 121 at measurement site 21. Measurement structure 121 produces nine reflected signal beams 101 that are passed through AOD 90 to produce reflected signal beams 116 that in turn are conveyed to the nine photodetectors 200 along with a reflected reference beam 72. The nine photodetectors operate in parallel to produce nine fringe signals 202 that are input to the nine phase detectors 204. Each phase detector operates in response to signals from timing and control circuit 210 to compare its respective fringe signal to the REF signal, to derive one of phase signals 206. The timing and control circuit synchronizes its operations based upon the REF signal. The nine phase signals contain information concerning the phases of the nine reflected signal beams 101 from measurement structure 121, and therefore information concerning the absolute position of test plate 164 at measurement site 121. The nine phase signals are conveyed to a suitable computer by multiplexer 208. Once the phases of the fringe signals have been measured, timing control circuit 210 changes control signal 214 such that the deflected signal beam slews from beam 91 to beam 92. The above process is then repeated, this time for measurement structure 122. This process is then repeated until a measurement cycle is complete, i.e., until the phases of nine fringe signals at all measurement sites have been measured. The next measurement cycle is then commenced, beginning with measurement structure 121.

The time required for the interferometer to complete one measurement cycle depends upon the number of measurement sites, the time required to complete the phase measurements at each measurement site, and the slew rate of AOD 90. The time required to complete a measurement cycle in turn determines the maximum fringe rate. There is thus a tradeoff between the number of measurement sites and the maximum fringe rate and maximum measurement site velocity that can be determined by the interferometer. For an embodiment having ten measurement sites and a REF signal frequency of 100 kHz, and for typical AOD slew rates, the time required to complete a measurement cycle is on the order of 450 microseconds. Thus since there can be no more than 0.5 fringes during each 450-microsecond measurement cycle, the maximum fringe rate is 1.1 kHz, and the maximum target velocity is 0.7 millimeters per second.

Figure 5:
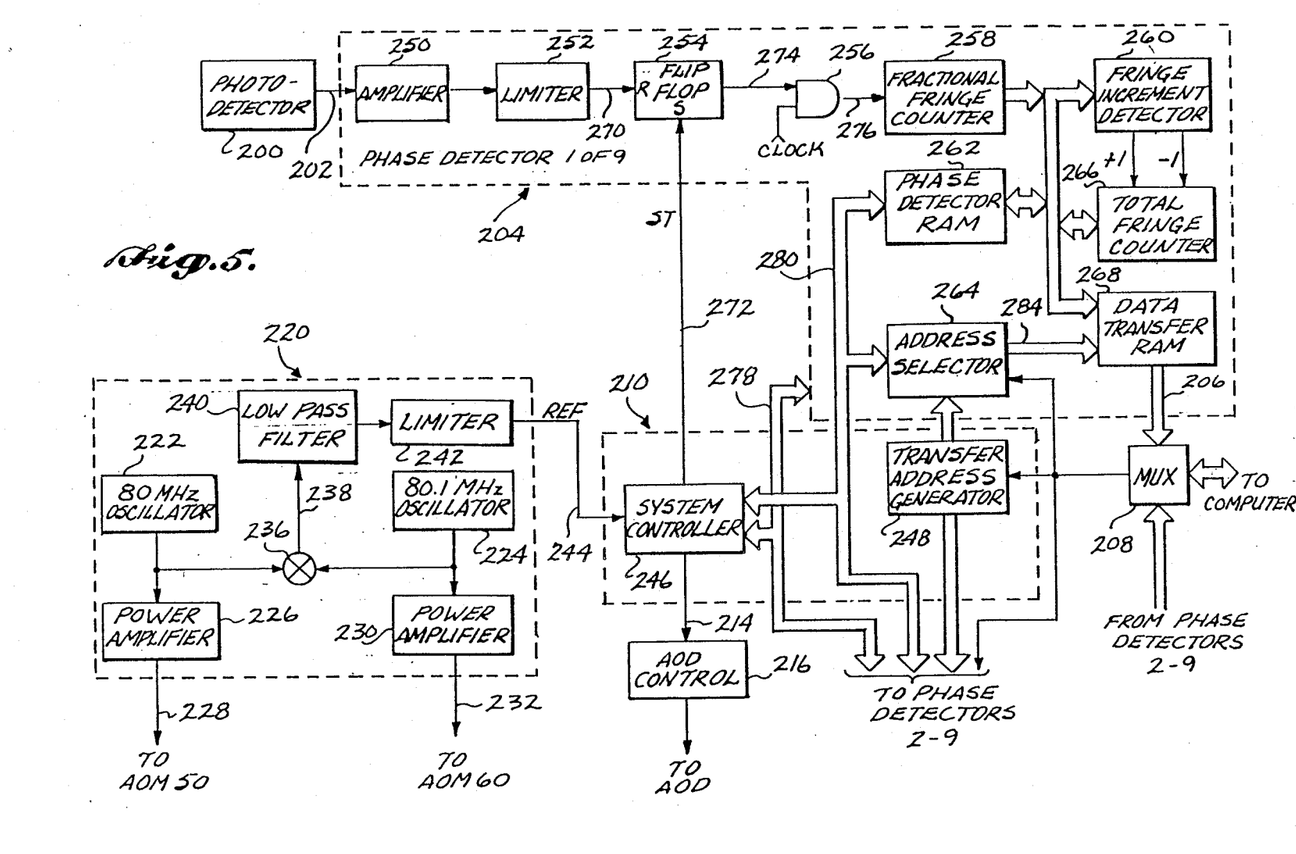
FIG. 5 is a more detailed block diagram of the signal processing components of the interferometer.

A more detailed block diagram of the signal processing components is set forth in FIG. 5. The system shown in FIG. 5 includes photodetector 200, phase detector 204, multiplexer 208, timing control circuit 210, and reference generator 220, as in FIG. 4. Timing control circuit 210 includes system controller 246 and transfer address generator 248. System controller 246 provides control signal 214 for controlling AOD control 216 that in turn controls the operation of AOD 90. System controller 246 provides a start (ST) signal on line 272 that is used to start each scanning cycle, as described in more detail below. The system controller also provides control signals on bus 278 and address signals on bus 280 that control the operation of each phase detector 204. Transfer address generator 248 operates in connection with multiplexer 208 to provide addresses for transferring data from the phase detectors to the multiplexer for transmission to the computer.

Reference signal generator 220 includes 80 MHz oscillator 222 and 80.1 MHz oscillator 224. The output of oscillator 222 is amplified by power amplifier 226, and the amplified signal on line 228 is then used to drive AOM 50 (see FIG. 1). In a similar manner, the output of oscillator 224 is amplified by power amplifier 230 and the output of power amplifier 230 on line 232 is used to drive AOM 60. Mixer 236 combines the outputs of oscillators 222 and 224, to produce a signal on line 238 that includes a 100 kHz difference signal that is input to low pass filter 240. The low pass filter removes frequency components higher than 100 kHz. The output of low pass filter 240 is processed by limiter 242 to produce a square wave reference signal (REF) on line 244 having a frequency of 100 kHz.

As is well known to those skilled in the art, modulation of the signal and reference beams at different frequencies results in a fringe signal at a frequency signal to the difference between the modulation frequencies. Furthermore, such a fringe signal preserves the relative phases of the signal and reference beams, and therefore the path length between the signal and reference beams. Phase detector 204 uses the REF signal on line 244 as a reference to repeatedly measure the phase of the fringe signal with respect to the REF signal. The phase of the fringe signal is measured by a start/stop counter method in which the interval between a rising edge of the REF signal and the next succeeding rising edge of the fringe signal is measured.

Phase detector 204 shown in FIG. 5 comprises amplifier 250, limiter 252, flip-flop 254, and gate 256. Amplifier 250 amplifies fringe signal 202, and the amplifier fringe signal is limited by limiter 250 to produce a square wave fringe signal on line 270. Amplifier 250 preferably comprises automatic gain control means. The signal on line 270 is input to the reset input of flip-flop 254. The set input of flip-flop 254 receives a start (ST) signal from timing control circuit 210 on line 272.

Figure 6:
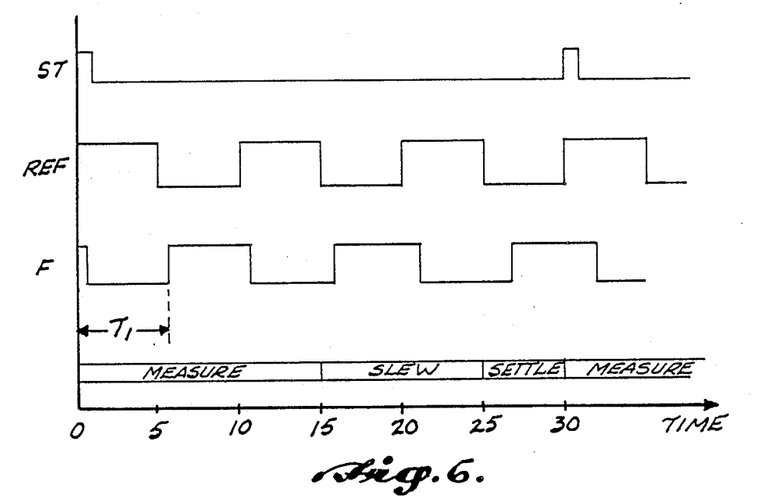
FIG. 6 is a signal diagram showing one scanning cycle.

The modified fringe signal on line 270 is illustrated by signal F in FIG. 6. FIG. 6 also illustrates the 100 kHz REF signal and the ST signal.

The signal processing system shown in FIG. 5 is adapted to allocate a 30-microsecond scanning period to each successive measurement site. The 30-microsecond scanning period is equal to three cycles of the REF signal. FIG. 6 illustrates that the 30-microsecond scanning period allocates 15-microseconds for making a phase measurement, 10 microseconds for slewing the signal beam to the next deflected signal beam position, and 5 microseconds for AOD 90 to settle and produce a stable output at the new deflected signal beam position. Each scanning period commences with an ST pulse produced by timing control circuit 210 on line 272. The ST pulse is produced once for each three cycles of the REF signal. The rising edge of the ST pulse on line 272 sets flip-flop 254, thereby producing a signal on line 274 that enables gate 256, causing the gate to pass a high-frequency clock signal to its output on line 276. Clock pulses continue to be produced on line 276 until the next rising edge of the modified fringe signal F on line 270. Such rising edge resets flip-flop 254, thereby disenabling gate 256 and stopping the production of clock pulses on line 276. The period of time which age 256 is enabled is indicated by $T_1$ in FIG. 6.

In order to measure movement at a measurement site, the interferometer must compare the phase of a given fringe signal measured during one measurement cycle with the phase of the same fringe signal during the prior measurement cycle. Phase detector 204 therefore operates by storing each phase measurement, and by subsequently comparing the stored phase measurement with the next phase measurement for a particular reflected signal beam and measurement site, to determine phase change. These operations are performed by fractional fringe counter 258, fringe increment detector 260, phase detector RAM 262, address selector 264, fringe increment counter 266, and data transfer RAM 268. To simplify the following discussion, it will be assumed that the CLOCK signal input to gate 256 has a frequency of 10 MHz, i.e., there are 100 CLOCK pulses for each cycle of the REF signal. Phase detector 204 operates by counting the number of clock pulses produced on line 276 for each scanning period, and by comparing such number with the corresponding stored number for the same scanning period in the prior measurement cycle, to thereby determine the amount and direction of the phase change between the two measurement cycles. The phase detector operates in response to control signals from system controller 246 on bus 278, and address signals from the system controller on bus 280.

The CLOCK pulses on line 276 are counted by fractional fringe counter 258 to produce a fractional fringe count (a number from 0-99) that represents the fractional phase difference between the fringe and REF signals. During the 15-microsecond measurement period for a given scanning cycle, the prior fractional fringe count for the same fringe signal (i.e., the fringe signal from the same measurement site) is loaded from the phase detector RAM into fringe increment detector 260, and the prior total fringe count for the same fringe signal is loaded from the phase detector RAM into total fringe counter 266. At the end of the 15-microsecond measurement period, fringe increment detector receives the current fractional fringe count from fractional fringe counter 258, and compares the current fractional fringe count to the prior fractional fringe count. If fringe increment detector 260 determines that the whole number portion of the phase difference between the fringe and REF signals has changed, then total fringe counter 266 is incremented or decremented by one, depending upon the direction of the change. The whole and fractional fringe counts are then stored in phase detector RAM 262 to be used during the corresponding scanning period for the next measurement cycle. The whole and fractional fringe counts are simultaneously stored in data transfer RAM 268, for transmission to the computer upon request.

The operation of these phase detector components can best be understood by means of examples. At the beginning of a scanning cycle, the total and fractional fringe counts for the current measurement site and scanning period are loaded from the phase detector RAM into total fringe counter 266 and fringe increment detector 260, respectively. Fractional fringe counter 258 then determines a count value from 0–99 that represents the current fractional phase difference between the fringe and REF signals. Assume that the total and fractional fringe counts are 2 and 50, respectively, and that fractional fringe counter measures a current fractional fringe count of 70. In this case, the absolute phase difference between the fringe and REF signals has increased from 2.50 to 2.70. Thus, fringe increment detector 260 does not detect a whole fringe increment, and does not increment or decrement the value 2 stored in total fringe counter 266. The total fringe count of 2 and the new fractional fringe count of 70 are then stored in phase detector RAM 62, and the phase detector then prepares itself for the next scanning period by resetting counter 258.

For a second example, assume that the prior whole and fractional fringe counts were 2 and 90, respectively, and that the currently measured fractional fringe count is 10. In this case, the whole fringe count would be incremented to 3, and the new whole and fractional fringe counts stored in phase detector RAM 262 would be 3 and 10, respectively. In a similar manner, if the prior whole and fractional fringe counts were 2 and 10, respectively, and if the new fractional fringe count was 90, then the new whole and fractional fringe counts would be 1 and 90, respectively. In a preferred arrangement, fringe increment detector 260 will increment or decrement the total fringe count by one whenever the fractional fringe count changes between a first range of 70–100 and a second range from 0–39.

Whenever new whole and fractional fringe counts are stored in phase detector RAM 262 at the end of each scanning period, timing control circuit 210 provides an address selection signal on bus 280 that causes address selector 264 to cause such data to be written into corresponding locations in data transfer RAM 268. During data transfer to the computer, the signal on bus 280 causes address selector 264 to put the data transfer RAM address on bus 284 under the control of transfer address generator 248. During this time period, multiplexer 208 operates asynchronously to transfer data from data transfer RAM 268 to a computer for data processing. Multiplexer 208 operates in an identical manner with respect to the other eight phase detectors 204.

While the preferred embodiments of the invention have been illustrated and described, it is to be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A scanning interferometer for measuring the movement of a plurality of measurement sites on a test structure, the interferometer comprising:
   a source of coherent radiation for producing an input beam travelling in a first direction;
   beam splitter means for dividing the radiation into a reference beam travelling in a second direction and a signal beam travelling in a third direction, the second and third directions being fixed when the first direction is fixed;
   deflection means including means for bidirectionally deflecting the signal beam through a set of discrete incremental angles in response to a control signal, to sequentially produce a plurality of deflected signal beams such that each deflected signal beam is directed to a different one of the respective measurement sites, said deflection means being further operative to bidirectionally deflect the reference beam through the set of incremental angles;
   reflection means at each measurement site for reflecting the deflected signal beam to produce a reflected signal beam;
   combining means for combining each reflected signal beam with the reference beam to produce an interference pattern;
   detection means including a photodetector positioned to measure the irradiance at a point in the interference pattern to thereby produce a fringe signal; and
   signal processing means including means for periodically measuring the phase of the fringe signal for each deflected signal beam, to thereby measure the movement of each measurement site.

2. The interferometer of claim 1, further comprising means for modulating the signal and reference beams at first and second frequencies, respectively, and wherein the signal processing means includes means for producing a reference signal having a frequency equal to the difference between the first and second frequencies, and means responsive to the reference signal for periodically measuring the phase of the fringe signal for each deflected signal beam to thereby measure the movement of each measurement site.

3. The interferometer of claim 2, wherein the means for generating the control signal is adapted to produce the control signal such that the deflected signal beam is sequentially directed to a new measurement site each time that a predetermined integer number of cycles of the reference signal have elapsed.

4. The interferometer of claim 1, wherein the deflection means comprises an acousto-optic deflector for sequentially deflecting the signal beam to produce the deflected signal beams, and beam steering means for conveying each deflected signal beam to one of the measurement sites.

5. The interferometer of claim 4, wherein the reference beam passes twice through the acoustic-optic deflector as it travels from the beam splitting means to the combining means.

6. The interferometer of claim 5, wherein the signal beam enters the acousto-optic deflector from a first direction, wherein the reference beam enters the acousto-optic deflector from a second direction different from the first direction, the acousto-optic deflector sequentially producing nine deflected reference beams, and wherein the interferometer further comprises reference beam reflection means for reflecting all deflected reference beams back through the acousto-optic deflector to produce a common reference beam.

7. The interferometer of claim 6, wherein the reference beam reflection means comprises a spherical mirror.

8. The interferometer of claim 6, wherein the common reference beam exits from the acousto-optic deflector in a third direction different from the first and second directions.

9. The interferometer of claim 1, wherein the signal processing means includes a phase detector that comprises means for measuring the phase of the fringe signal for each deflected signal beam to thereby produce a phase signal for each deflected signal beam, means for storing each phase signal, means for comparing each phase signal with a phase signal previously determined and stored for the same deflected signal beam to produce a phase change signal for each deflected signal beam, and means for processing the phase change signals to measure the movement of each measurement site.

10. The interferometer of claim 1:
wherein each reflection means is adapted to produce nine reflected signal beams that in combination contain information specifying the position and orientation of the corresponding measurement site;
wherein the combining means combines each reflected signal beam with the reference beam to produce nine interference patterns;
wherein the detection means comprises nine photodetectors positioned to measure the irradiance at points in the nine interference patterns, respectively, to thereby produce nine fringe signals;
wherein the signal processing means includes means for periodically measuring the phase of each fringe signal for each deflected signal beam, to thereby measure the movement of each measurement site.

11. The interferometer of claim 10, wherein each reflection means comprises a reference structure and first, second and third test reflectors fastened to the test structure at the respective measurement site, the reference structure comprising three reference reflectors and beam forming means, each reference reflector being positioned to intercept a portion of the deflected signal beam and to produce one of the reflected signal beams, whereby the orientation of the reference structure may be determined, the beam forming means being adapted to receive the deflected signal beam and produce six test beams therefrom, three test beam being directed to the first test reflector to thereby produce three of the reflected signal beams, two test beams being directed to the second test reflector to thereby produce two of the reflected signal beams, and one test beam being directed to the third test reflector to thereby produce one of the reflected signal beams, whereby the position and orientation of the measurement site with respect to the reference structure may be determined.

12. The interferometer of claim 10, further comprising means for modulating the signal and reference beams at first and second frequencies, respectively, and wherein the signal processing means includes means for producing a reference signal having a frequency equal to the different between the first and second frequencies, and means responsive to the reference signal for periodically measuring the phase of the fringe signal for each deflected signal beam to thereby measure the movement of each measurement site.

13. The interferometer of claim 12, wherein the means for generating the control signal is adapted to produce the control signal such that the deflected signal beam is sequentially directed to a new measurement site each time that a predetermined integer number of cycles of the reference signal have elapsed.

14. The interferometer of claim 10, wherein the deflection means comprises an acousto-optic deflector for sequentially deflecting the signal beam to produce the deflected signal beams, and beam steering means for conveying each deflected signal beam to one of the measurement sites.

15. The interferometer of claim 14, wherein the reference beam passes twice through the acousto-optic deflector as it travels from the beam splitting means to the combining means.

16. The interferometer of claim 15, wherein the signal beam enters the acousto-optic deflector from a first direction, wherein the reference beam enters the acousto-optic deflector from a second direction different from the first direction, the acousto-optic deflector sequentially producing nine deflected reference beams, and wherein the interferometer further comprises reference beam reflection means for reflecting all deflected reference beams back through the acousto-optic deflector to produce a common reference beam.

17. The interferometer of claim 16, wherein the reference beam reflection means comprises a spherical mirror.

18. The interferometer of claim 16, wherein the common reference beam exits from the acousto-optic deflector in a third direction different from the first and second directions.

19. The interferometer of claim 10, wherein the signal processing means comprises a phase detector associated with each photodetector and fringe signal, the phase detector including means for measuring the phase of the associated fringe signal for each deflected signal beam to thereby produce a phase signal for each deflected signal beam, means for storing each phase signal, means for comparing each phase signal with a phase signal previously determined and stored for the same deflected signal beam to produce a phase change signal for each deflected signal beam, and means for processing the phase change signals to measure the movement of each measurement site.

* * * * *

UNITED STATES PATENT AND TRADEMARK OFFICE
CERTIFICATE OF CORRECTION

PATENT NO. : 4,890,921

DATED : January 2, 1990

INVENTOR(S) : Pond et al.

It is certified that error appears in the above-identified patent and that said Letters Patent is hereby corrected as shown below:

| Column | Line | Error |
|--------|------|-------|
| 2 | 9 | "different" should be --difference-- |
| 2 | 49 | After the word "reflected" insert the word --signal-- |
| 3 | 10 | "acoustooptic" should be --acousto-optic-- |
| 4 | 27 | After the word "reference" insert the words --beam 52, such that the reflected reference beam strikes relay mirror 74 rather-- |
| 5 | 52 | After the word "form" delete the word "the" |
| 7 | 48 | "signal" should be --equal-- |
| 7 | 62 | "amplifier" should be --amplified-- |
| 8 | 25 | "age" should be --gate-- |
| 11 | 53 | "beam" should be --beams-- |
| 12 | 8 | "different" should be --difference-- |

Signed and Sealed this

Twenty-ninth Day of January, 1991

*Attest:*

HARRY F. MANBECK, JR.

*Attesting Officer*      *Commissioner of Patents and Trademarks*